April 27, 1965   H. F. SAMPSON   3,180,204
PRIMER TOOL
Filed May 25, 1962   2 Sheets-Sheet 1
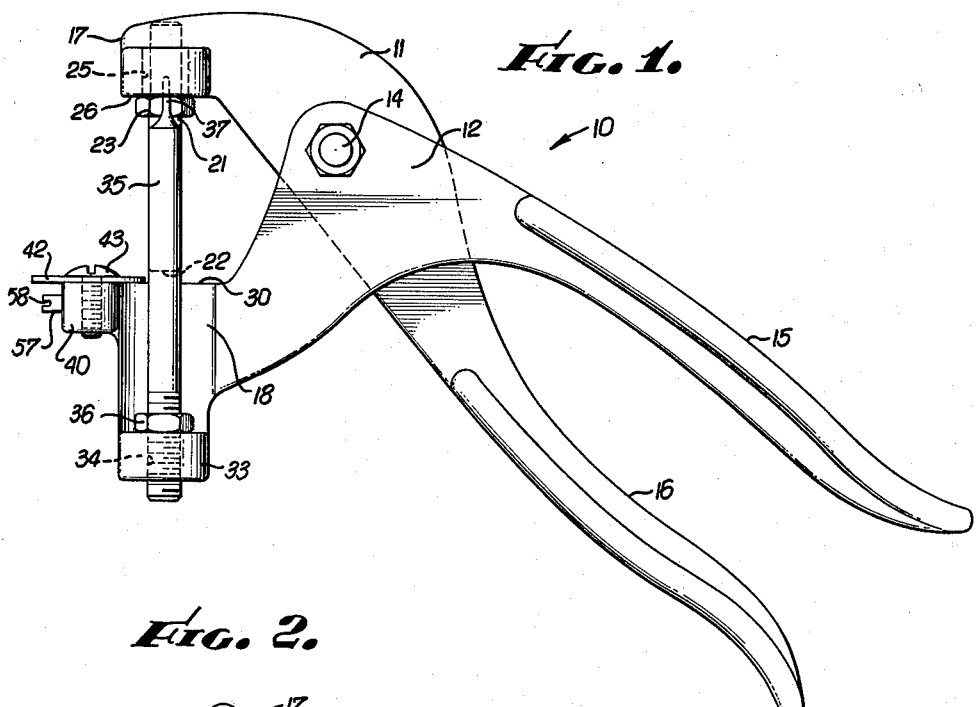
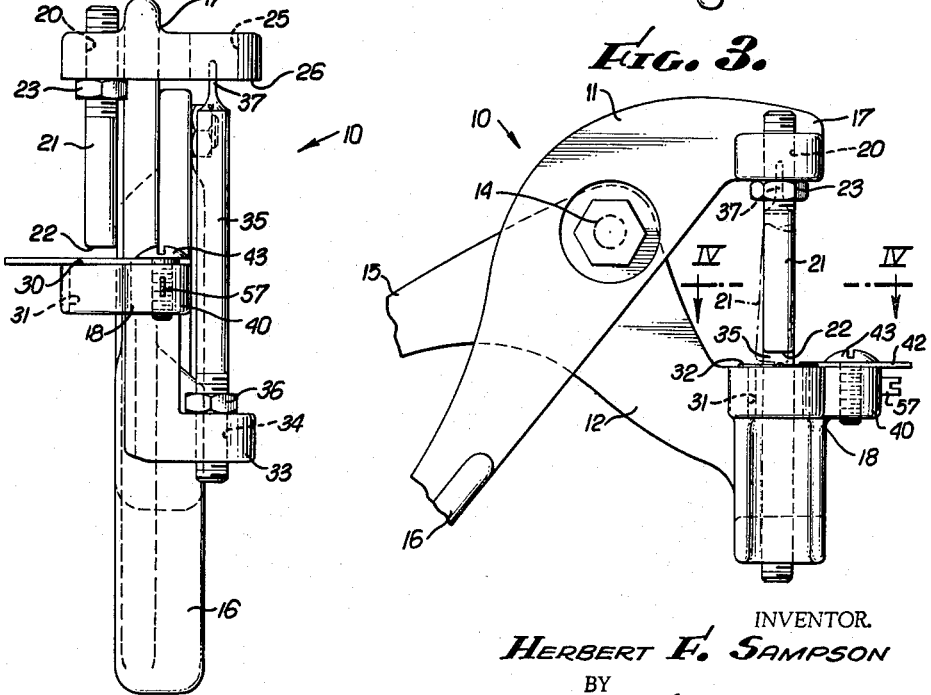
INVENTOR.
HERBERT F. SAMPSON
BY
Miketta and Glenny
ATTORNEYS.

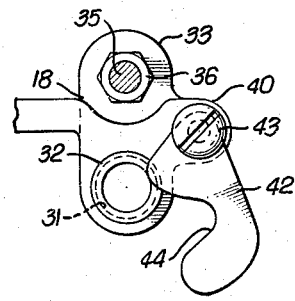
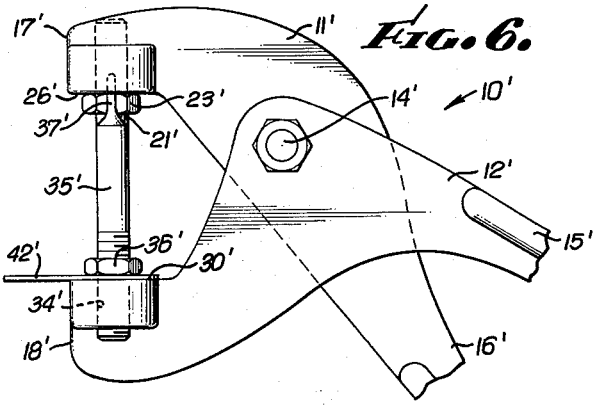
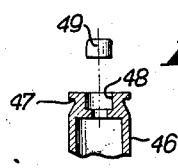
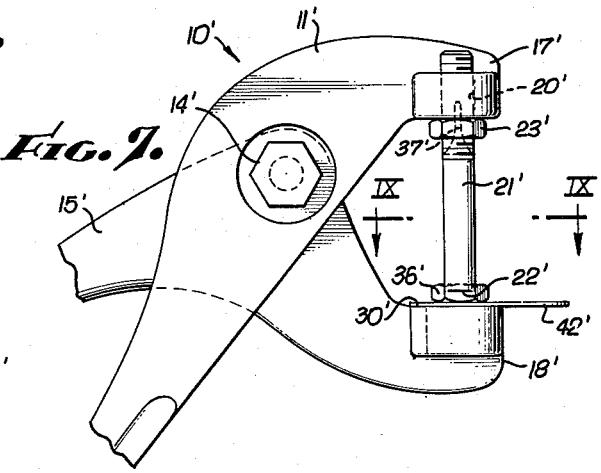
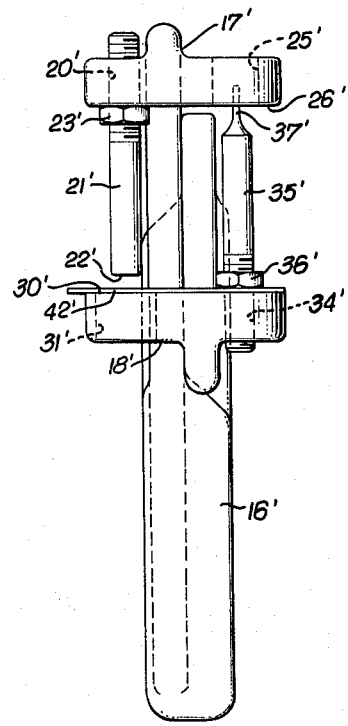
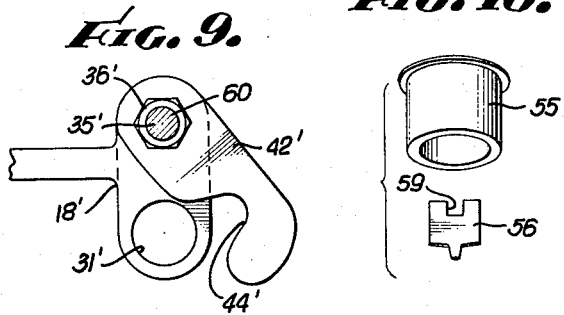

United States Patent Office 3,180,204
Patented Apr. 27, 1965

3,180,204
PRIMER TOOL
Herbert Francis Sampson, 1604 Newport Blvd.,
Costa Mesa, Calif.
Filed May 25, 1962, Ser. No. 197,732
6 Claims. (Cl. 86—37)

This invention relates to a tool means for priming and depriming shell casings for firearms, such as rifles and pistols. More particularly, the invention relates to a novel, manually operated decapping and priming device adapted for use with shell casings and primers of various caliber and size.

The tool means of this invention is generally used to insert or press a live primer cap into the end of an empty shell casing of either rim or rimless type and, also, to eject an expended or fired primer cap from such a shell casing. Many persons employing firearms for target practice, hunting and the like, desire to load and prime their own shell casings. The present tool is particularly adapted for manual priming of a casing and has been particularly designed for shell casings which may be primed with only a primer (no powder) and which may carry a plastic-type bullet which may be associated with the shell casing in suitable manner.

The present invention generally contemplates an improved, novel construction and arrangement of such a tool means wherein a pair of pivotally interconnected handle members are provided with opposed jaw portions which include opposed cooperable shell holding or positioning means and primer cap contacting elements for decapping and priming the shell casing. The particular arrangement of the jaw portions with respect to the handle members provides a novel action for the setting or pressing of a primer cap into the shell casing and also provides an arrangement by which the shell casing and the primer cap may be readily observed while using the tool. The present tool also contemplates a means for aligning and setting an anvil element normally contained in a shotgun battery cup primer device.

The main object of the present invention is to disclose and provide a tool means for facilitating manual priming and decapping of a shell casing.

An object of the invention is to disclose and provide a tool means including pivotally interconnected handle members and associated opposed jaw portions which are so disposed that a primer pressing action includes a lateral force component so that a primer cap will be accurately located and urged into its proper position in the shell casing.

A further object of the invention is to disclose and provide a tool means for priming and decapping a shell casing wherein lock means are provided for holding a shell casing in desired position during operation of the tool.

A further object of the invention is to disclose and provide a tool means provided with jaw portions so arranged in opposed relation as to accommodate either pistol shell casings or relatively long rifle shell casings.

Still another object of the invention is to disclose and provide a tool means as above mentioned wherein adjustment means are provided for shell casings of different caliber and length.

A still further object of the invention is to disclose and provide a tool means as mentioned above wherein one of the jaw portions is provided with means for facilitating priming of a shotgun shell casing.

It will be understood that various other objects and advantages will be readily apparent from the following description of the drawings in which exemplary embodiments of the present invention are shown.

In the drawings:

FIG. 1 is a side elevation of a tool means embodying this invention.

FIG. 2 is a front view of FIG. 1.

FIG. 3 is an enlarged fragmentary elevational view of the jaw portions of the tool means shown in FIG. 1, the elevational view being taken from the side opposite to that shown in FIG. 1.

FIG. 4 is a transverse sectional view taken in a plane indicated by line IV—IV of FIG. 3.

FIG. 5 is an exploded sectional view of the end of a shell casing and primer cap in relation thereto.

FIG. 6 is a fragmentary side elevational view of a tool means embodying a modification of the invention.

FIG. 7 is an elevational view taken from the opposite side of FIG. 6.

FIG. 8 is a front view of the tool means shown in FIG. 6.

FIG. 9 is a horizontal sectional view taken in the plane indicated by line IX—IX of FIG. 7.

FIG. 10 is a fragmentary exploded view of a battery cup for a shotgun shell casing.

In the embodiment of this invention shown in FIG. 1, a tool means or device generally indicated at 10 includes a pair of members 11 and 12 having a pivotal interconnection at 14 and provided with downwardly inclined handle portions 15 and 16 when held in normal operative position. Handle portions 15 and 16 may be grasped by a hand of an operator and may be squeezed towards each other. Handles 11 and 12 may be made of any suitable metal or other rigid material and in this example may be cast or molded. Ultimate closed position of the members 11 and 12 is indicated in FIG. 3 by dotted lines. The members 11 and 12 respectively, include jaw portions 17 and 18 in opposed generally aligned relation with jaw portion 17 lying slightly above pivotal connection 14 and the jaw portion 18 lying substantially below pivotal connection 14 as shown.

Jaw portion 17 lies generally transverse with respect to handle portion 16. On one side of the jaw portion 17 may be provided a threaded bore 20 in which may be threaded a depending rod-like primer pressing and contacting element 21 having a circular end face 22 provided with beveled edges. The pressing element 21 may be secured in the threaded bore 20 by a securement nut 23. Element 21 may be longitudinally adjusted and positioned so that end face 22 is in selected spaced relation with respect to opposed jaw portion 18. Preferably, end face 22 of element 21 is spaced above the opposed face of jaw portion 18 a selected distance sufficient so that when a shell casing is held by jaw portion 18 as later described, the axis of element 21 and the axis of the shell casing will be substantially aligned when the preselected space therebetween is provided.

The opposite side of jaw portion 17 includes a through bore 25 adapted to position a shell casing with the primer cap end of the shell casing abutting the bottom face 26 of jaw portion 17, as later described.

Jaw portion 18 is likewise transversely arranged with respect to its handle portion 15 and provides a top face 30 lying substantially below the pivotal connection 14 and lying parallel to the bottom face 26 of jaw portion 17 when the handle members 15 and 16 are in the position shown in FIG. 1. Jaw portion 18 at one side of its member 11 includes a through bore 31 in alignment with element 21 and adapted to receive a selected bushing 32 for adapting bore 31 to the size of shell casing to be received and held therein. On the opposite side, jaw portion 18 includes a downwardly, laterally offset projection 33 which includes a threaded through bore 34 in which may be threadedly adjustably mounted a rod-like deprimer element 35. Element 35 may be locked in adjusted position by a nut 36 and extends upwardly with its axis in general alignment with the axis of bore 25. Element 35 has a reduced end section 37 adapted to normally extend into bore 25 and into spaced relation to the distal opening of the bore. The downward extension of jaw portion 18 and the relatively long depriming element 35 is particularly adapted to accommodate rifle shell casings; it may also be used for pistol shell casings.

It will thus be apparent that opposed jaw portions 17 and 18 include companion shell casing holding or positioning means in laterally offset relation with respect to handle portions 15, 16 and in alignment with respective decapping and priming elements 21 and 35.

Jaw portion 18 may include a forwardly projecting section 40 provided with a lock means for holding a rim-type shell in bore 32. The lock means may comprise a lock element 42 pivotally mounted as by a screw 43 to section 40 and swingable into cooperable relation with bore 32. Lock element 42 includes a recess 44 with converging edges adapted to be received and slip into an annular groove 47 beneath the rim of a rim-type cartridge or shell casing.

In operation and use of tool means 10, a rim-type cartridge shell casing 46 to be primed may be inserted in bore 32 and lock element 42 swung into cooperable locking engagement with the annular groove 47 on the shell casing to hold the casing against movement. The shell casing has an end recess 48 into which a primer cap 49 is to be pressed. When the shell casing 46 is locked in position in bore 32, the primer cap 49 may be seated at recess 48 in general alignment therewith. Primer pressing element 21 is then moved downwardly in an arcuate path by light, squeezing pressure upon handle portions 15 and 16, until end face 22 rests upon the upper surface of cap 49. As handle portions 15 and 16 are further gently squeezed together, end face 22 of element 21 slides against and across the top face of the primer cap and gently pushes or presses primer cap 49 into recess 48. This pressing action is stopped by engagement of end face 22 with the adjacent end face of shell casing 46. The disposition of primer end face 22 substantially below pivotal connection 14 permits element 21 to swing through a slight arc as it presses the cap into the shell casing. This action of element 21 thus simulates a "pawing" action whereby a primer cap is not only urged downwardly, but is actually further aligned or set into proper relation with the recess 48. In prior proposed tools, where a pressing element is reciprocated coaxially with a primer cap recess, any obstruction or tightness of fit, which resists the direct reciprocally acting force may result in firing of the primer cap and obviously this is not desired. The "pawing" action of element 21 eliminates excessive resistance to the pressing of the primer cap into the recess 48 and virtually eliminates unintentional firing of the primer cap.

When the shell has been fired and it is desired to eject the fired primer cap 49 from the shell casing, the fired shell casing may be sleeved over ejection element 35 with the open end of the shell casing facing downwardly and receiving the upstanding ejection element 35. The element 35 is longitudinally adjusted so that when the handle members are in slightly opened position from that shown in FIG. 1, the top end 37 thereof will be in contact with the internal face of a primer cap and below the bottom opening of bore 25, the end face of the casing being in abutment with the bottom face 26 of the jaw portion 17. As the handle members are squeezed gently together, the element 35 will eject the primer cap from the casing recess 47, the cap being received in bore 25. Such ejection of the primer cap is readily and easily accomplished.

The tool means of this invention may also be used to prime shotgun shell casings. For this purpose, a shotgun shell casing battery-cup 55 (FIG. 10) includes a flat anvil member 56 which must be repositioned after firing within the battery-cup 55 for proper priming. For this purpose, a forwardly projecting yoke-shaped element 57 may be secured to the front face of jaw portion 18. The element 57 includes a forwardly opening slot or recess 58 which is adapted to receive anvil element 56 when it is initially positioned within the battery-cup 55, the anvil element having a cooperable recess 59 adapted to permit interleaving or inter-engagement of the element 56 and the element 57 in 90° relation. Thus by manually pressing the battery cup with anvil element initially located therein against the element 57 the anvil element 56 may be properly aligned and longitudinally positioned in battery-cup 55 so that when a primer cap 49 is assembled therewith in the manner aforedescribed, proper priming of the shotgun shell casing may be accomplished.

The embodiment of the invention shown in FIGS. 1–4 is particularly designed for use with relatively long rifle shell casings. The modification of the invention shown in FIGS. 6–9 includes a tool means 10' adapted for priming and depriming pistol shell casings which have relatively short length. Like parts will be given like reference numerals with a prime sign.

In FIG. 6, tool means 10' includes handle members 11', 12' pivotally interconnected together at 14'. The handle member 11' includes a top front jaw portion 17' provided with a depending threadedly adjustable primer contacting element 21' and a bore 25' on the opposite side of the jaw portion. Jaw portion 17' is similar to jaw portion 17.

Handle member 15' includes jaw portion 18' having a through bore 31' in axial alignment with primer element 21' when the handle members are positioned as shown in FIGS. 6 and 8, the bore 31' being adapted to receive and position a pistol shell casing with its top immediately below the bottom circular beveled face 22' of element 21'. The jaw portion 18' also carries an upstanding primer contacting element 35' threadedly adjustable in a threaded bore 34' and having a reduced top end portion 37' adapted to seat against and press a primer cap from a fired pistol shell casing. The element 35' is in general alignment with the bore 25'. The length of elements 21' and 35' are substantially the same and it will be noted that the jaw portions 17' and 18' are provided with opposed faces 30' and 26'.

In this embodiment, lock element 42' may be pivotally mounted about the shank of primer contacting element 35' as indicated at 60. The lock element 42' has an open ended slot or recess 44' with converging edges in order to accommodate itself to annular grooves of different caliber pistol shell casings. Lock element 42' may be swung into operative relation with the bore 31' in jaw portion 18' for positioning and holding a shell casing in bore 31' as previously described.

Operation of the tool means shown in FIGS. 6–9, inclusive, is substantially the same as that described for the first embodiment of this invention. It is important to note that the tool means 10 and 10' may be readily opened so as to place a shell casing in the bores 31, 31' and that the location of the pivotal interconnection at 14, 14' in relation to the transverse or laterally disposed jaw portions 17 and 18 provides for the "pawing" action previously described in properly pressing a primer cap into the shell casing. The tool means 10 and 10' are adapted to be operated from the position substantially as shown in FIGS. 1 and 6 and such downward inclination of the handle members 15 and 16 with respect to the vertical disposition of the primer contacting elements enables one to readily observe a depriming and priming operation while facilitating manipulation of the tool means.

It will be understood that various modifications and changes may be made in the tool means described above

I claim:

1. A tool for decapping and priming a shell casing comprising: a pair of members having a pivotal connection between their ends and having handle portions and opposed jaw portions, one jaw portion including a primer pressing element extending at an acute angle to its handle portion, said one jaw portion also including a shell casing holding bore laterally spaced from said primer pressing element; the jaw portion of the other member being spaced from said pivotal connection a greater distance than the said one jaw portion and disposed in alignment with said one jaw portion, said other jaw portion including a shell casing holding bore in alignment with said primer pressing element and with its proximate opening normally spaced from the end of the primer pressing element when the primer pressing element and bore are in alignment, said other jaw portion including a primer ejection element opposed to the bore in said one jaw portion, said primer ejection element extending into such opposed bore and terminating adjacent the distal opening of the said bore, said pivotal connection having a pivotal axis lying in a plane extending between the jaw portions and between said primer pressing element and the primer ejection element.

2. A tool as stated in claim 1 wherein at least one of said jaw portions includes a lock means for retaining and holding a shell casing in the bore of said one jaw portion.

3. A tool as stated in claim 1 wherein one of said jaw portions includes a pivoted lock element adapted to engage the rim of a shell casing.

4. A tool as stated in claim 1 wherein one of said jaw portions includes a projecting element adapted for use with a battery cup and anvil of a shotgun-type shell.

5. A tool as stated in claim 1 wherein said handle portions, when said tool is in normally closed position, define an acute angle with a plane defined by said primer pressing and primer ejecting elements.

6. A primer tool means comprising: jaw means pivotally interconnected for movement toward and away from each other about an axis; said jaw means including aligned laterally spaced sets of elongated primer contacting elements and opposed bore means lying in a plane parallel to and spaced from said axis; handle means for said jaw means extending from said axis at an acute angle with respect to said plane whereby said plane is normally approximately vertical when said handle means are grasped and operated; said bore means being adapted to position a shell casing; one of said primer contacting elements having an end portion spaced from its opposed bore means and in alignment therewith, said one contacting element being movable along a curved path into out-of-alignment position when pressing a primer cap into a shell casing for imparting a lateral alignment force component to said primer cap, the other of said primer contacting elements being adapted to extend into its opposed bore means to a point adjacent the distal opening thereof to eject a fired primer cap from a shell casing, said primer contacting elements extending to opposite sides of said axis in said plane.

References Cited by the Examiner

UNITED STATES PATENTS

| | | | |
|---|---|---|---|
| 201,903 | 4/78 | Bailey | 86—37 |
| 257,860 | 5/82 | Gill | 86—37 |
| 269,448 | 12/82 | Northall | 86—37 |
| 536,045 | 3/95 | Ripley | 86—37 |
| 545,811 | 9/95 | McNeill et al. | 86—36 |
| 600,706 | 3/98 | Barnes | 86—37 |
| 735,047 | 8/03 | Alsop | 86—36 |
| 2,340,284 | 2/44 | Stevenson | 86—36 |
| 2,794,359 | 6/57 | Lyman | 86—38 |

OTHER REFERENCES

The American Rifleman, vol. 105, No. 6, June 1957, Shotshell Tool, pages 70, 72, 73, 76.

BENJAMIN A. BORCHELT, *Primary Examiner.*

SAMUEL W. ENGLE, SAMUEL BOYD, *Examiner.*